April 21, 1953 — F. BUCK — 2,635,675
SEAT WITH RESILIENTLY SUPPORTED ARM
Original Filed Dec. 14, 1942
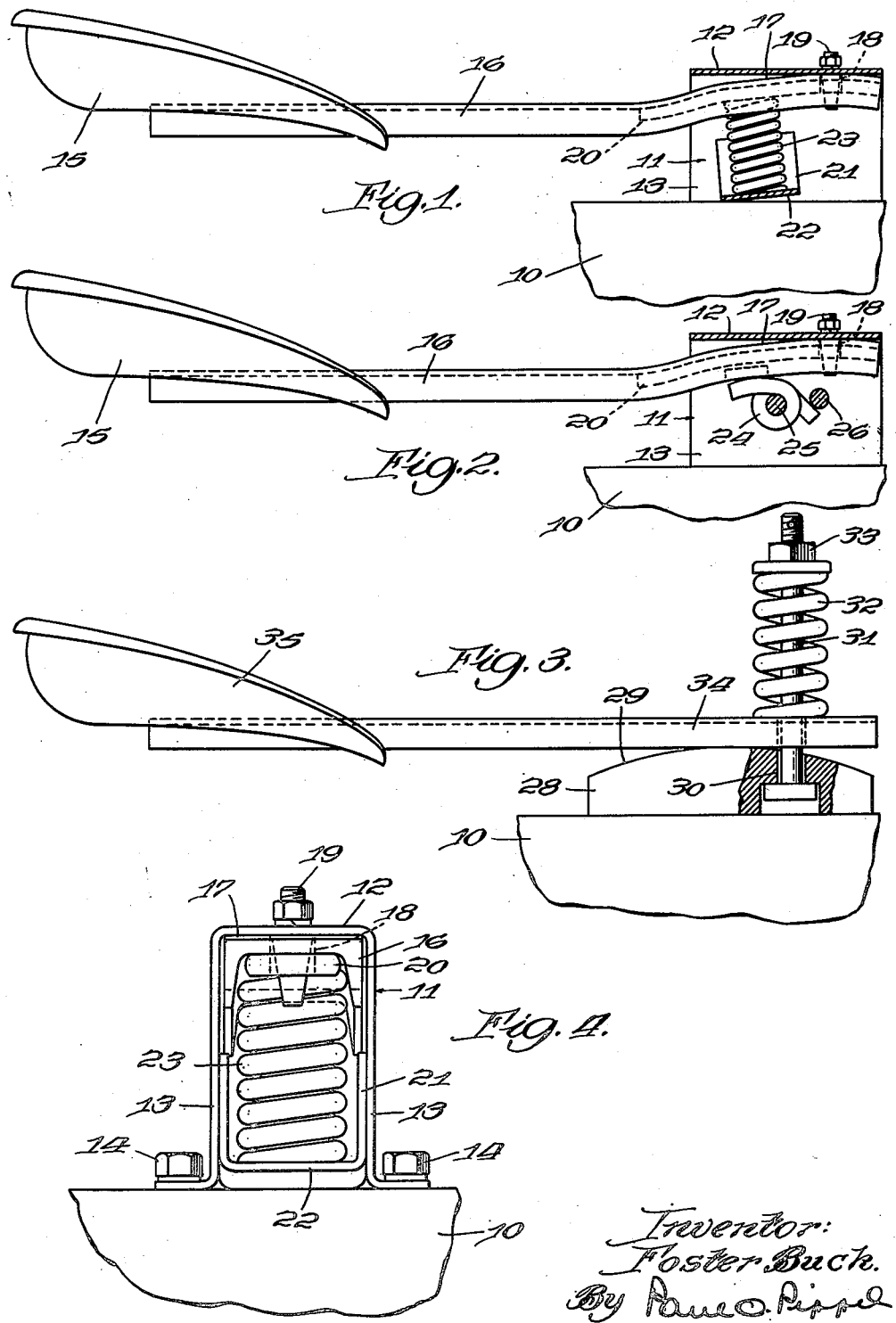
Inventor:
Foster Buck Patented Apr. 21, 1953

2,635,675

UNITED STATES PATENT OFFICE 2,635,675

SEAT WITH RESILIENTLY SUPPORTED ARM

Foster Buck, North Aurora, Ill., assignor to International Harvester Company, a corporation of New Jersey Continuation of application Serial No. 468,900, December 14, 1942. This application January 16, 1948, Serial No. 2,803

2 Claims. (Cl. 155—51)

This invention relates to a seat and more particularly to a seat for vehicles or the like. This application is a continuation of my copending application, Serial No. 468,900, filed December 14, 1942, for Seat.

The invention has for its principal object the provision of an improved resiliently supported seat incorporating therein means for varying the rate of the spring that serves as the resilient means, thereby providing a low spring rate for the normal riding and a higher spring rate to prevent bouncing of the seat when the vehicle strikes a bump.

An important object is to provide cam means between the seat and its support for providing a plurality of fulcrum points at varying distances from the connection between the seat and the resilient supporting means.

Another object is to provide a seat having an improved supporting means mounting the seat for lateral swinging between different positions.

And another object is to arrange the means for swinging the seat in conjunction with the spring-rate-varying means so that the latter means may function in either of two positions of the seat.

Further objects and desirable features of the invention may be had from the following detailed description and accompanying sheet of drawings, in which:

Figure 1 is a side view of a seat embodying one form of the invention;

Figure 2 is a similar view embodying a modification of the invention;

Figure 3 is a similar view embodying a further modification of the invention; and Figure 4 is an enlarged end view of the seat support and seat arm, as shown in Figure 1.

In the form of the invention shown in Figure 1, the numeral 10 indicates a base portion, which may be part of a vehicle or the like in which the seat structure is utilized. The base 10 carries a support 11, which as shown in Figure 4 is U-shaped in cross-section with the bight 12 of the U disposed at the top of the support and with the legs 13 of the U secured by bolts 14 to the base portion 10.

The supporting means 11 carries a seat structure including a seat 15 and a seat-carrying arm 16. The forward portion of the arm is shaped to provide an arcuate portion 17, and this portion is provided with a vertical opening or bore 18. A guide stud 19 is rigidly secured to and forms part of the portion 12 of the support and depends between the legs of the support through the opening 18 in the forward portion of the seat arm 16. The mounting portion of the stud is preferably tapered and forms a relatively loose fit with the seat arm 16. The forward portion of the seat arm, which as best shown in Figure 1 is channel shaped in cross-section, carries a strip 20 having an arcuate shape conforming to the curavture of the seat arm. The support 11 carries at a lower portion thereof an inverted U-shaped bracket 21 having a transverse lower portion 22 upon which is supported a vertically disposed compression spring 23. The upper end of the spring engages the under surface of the arcuate strip 20 that is carried by the forward portion of the seat arm 16. The seat and arm are thus mounted for oscillating or rocking movement with respect to the support, this movement being yieldably resisted by the spring 23. The relationship between the arcuate surface 17 of the seat arm 16 and the upper portion 12 of the support 11 is such as to provide rocking of the seat arm with respect to the support over a relatively great extent of the curved contact surface provided by the portion 17. As the seat arm is deflected vertically, the contact between the portion 17 of the seat arm and the portion 12 of the support varies longitudinally of the arm, with the result that the distance between the line of compression of the spring 23 and the contact point or fulcrum between the arm and support is varied.

In the position of the parts shown in Figure 1, the distance between the spring and fulcrum point is relatively less than the distance between the spring and another fulcrum point as the arm 16 is deflected downwardly. Thus, the leverage obtainable between the seat arm and the support is variable according to the compression or extension of the spring 23, this resulting in varying of the spring load.

The modification shown in Figure 2 is structurally and functionally substantially identical to that shown in Figure 1, and accordingly, corresponding parts are designated by the same reference characters. However, in the case of the structure shown in Figure 2, the compression spring 23 is replaced by a torsion spring 24, which is carried on a transverse pin 25 and having one end engaged by a second transverse pin 26 and its other end engaging the under portion of the seat arm 16 through the medium of the arcuate strip 20 carried between the sides of the seat arm channel.

In the form of the invention shown in Figure 3, the base portion 10 carries a support or supporting means 28 having an upper arcuate portion providing a curved contact surface 29. The support includes a vertical rod 31 extending upwardly through a vertical bore 30 in support 28 and arm 34. The vertical guide rod 31 is surrounded by a compression spring 32. The upper end of the rod is threaded and carries a washer and nut 33 that may be adjusted to vary the compression of the spring 32. The washer and nut 33 thus constitute a part of the supporting means against which one end of the spring 32 may react or abut. The other end of the spring 32 bears or abuts against the upper surface of a rigid seat arm 34. A seat 35 is carried at the other end of the seat arm.

The functioning of the structure just described is very similar to that set forth for the structures in Figures 1 and 2, the seat arm 34 being rockable over the curved contact surface 29 to vary the distance between the spring 32 and the fulcrum point between the arm 34 and support 28 and thus to vary the load on the spring 32.

In this instance, however, the mounting of the seat arm on the support, comprising the rod 31, permits lateral swinging of the seat for positioning of the seat at opposite sides of the rod 31. The arrangement is such that the seat may be pivoted to either side of the support 28, the cam surface 29 being cooperable with the seat arm 34 to provide substantially similar results as respects the varying of the spring load.

Further features of the construction and operation of the various modifications of the invention illustrated will be readily apparent to those skilled in the art. It will be understood, of course, that the modifications illustrated are only representative of the principles of the invention, and it is, accordingly, not intended that the disclosure limit the scope of the invention as defined in the appended claims.

What is claimed is:

1. A seat: comprising a support; a seat structure, including an arm; means mounting the arm on the support for oscillating movement, resilient means carried by the support and arranged to resist oscillation of the arm, a cam surface carried by the arm and extending along the length thereof and providing a plurality of fulcrum points for the arm on the support at increasing distances from the resilient means as an increasing load is applied on the seat, whereby the mechanical advantage of the resilient means is increased relative to the load on the seat.

2. A seat structure comprising a rigid arm extending in a horizontal direction, an operator's seat at one end of said arm, whereby the weight of an operator tends to swing the arm downwardly at the seat end, a supporting means having a contact portion, said rigid arm at its end opposite the seat having a contact portion adapted to engage the contact portion of the supporting means, said arm contact portion having a curved surface extending along the length thereof, whereby rocking movement of the rigid arm with respect to the supporting means when said contact portions are engaged provides a moving fulcrum, said rigid arm having an opening at the supporting means end, said supporting means including a fixed guide element extending loosely through said arm opening whereby said rigid arm is held against substantial lateral and fore and aft shifting relative to the supporting means during rocking movement with respect thereto, and resilient means positioned to abut the supporting means and to abut the rigid arm at a location spaced from the fulcrum in a direction lengthwise of the rigid arm and to exert pressure against said arm to develop a torque reaction around the fulcrum to counterbalance the operator's weight on the seat.

FOSTER BUCK.

References Cited in the file of this patent

UNITED STATES PATENTS

| Number | Name | Date |
| --- | --- | --- |
| 1,411,372 | Olson et al. | Apr. 4, 1922 |
| 1,864,282 | Sperry | June 21, 1932 |
| 2,136,198 | Stam | Nov. 8, 1938 |